Patented Feb. 20, 1923.

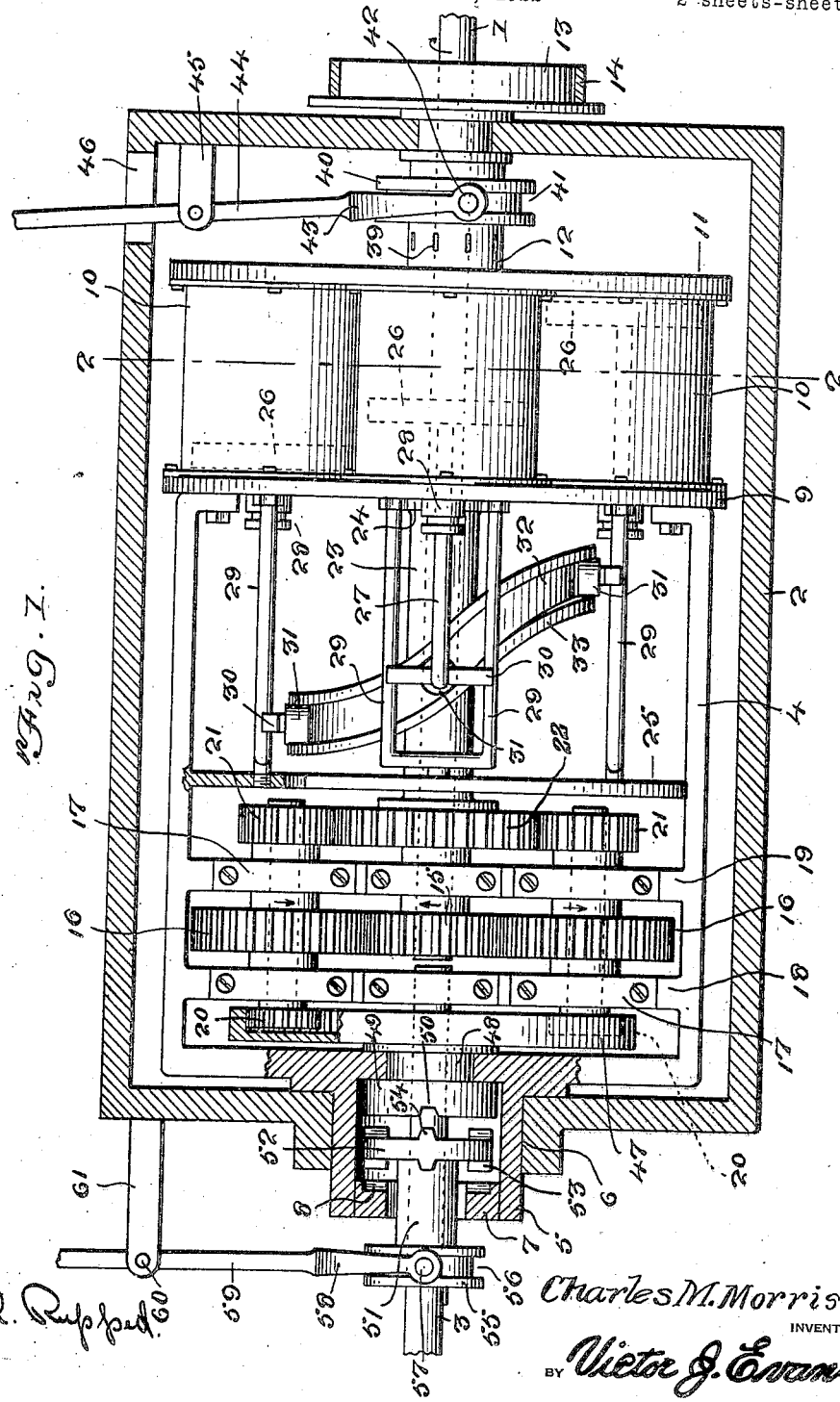

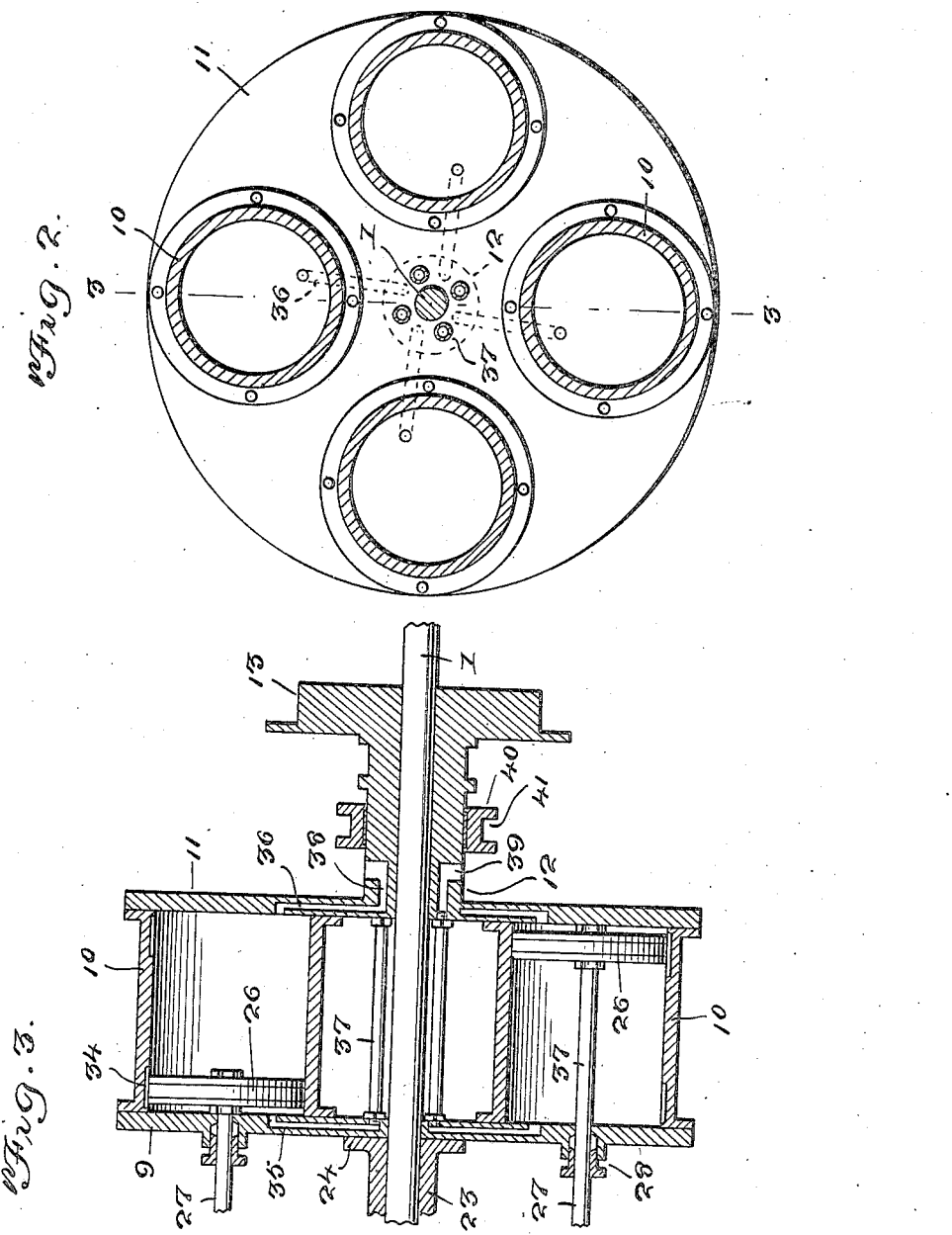

1,446,392

UNITED STATES PATENT OFFICE.

CHARLES M. MORRISON, OF HARRISBURG, PENNSYLVANIA.

MOTOR-VEHICLE TRANSMISSION.

Application filed June 23, 1922. Serial No. 570,348.

*To all whom it may concern:*

Be it known that I, CHARLES M. MORRISON, a citizen of the United States, residing at Harrisburg, in the county of Dauphin and State of Pennsylvania, have invented new and useful Improvements in Motor-Vehicle Transmission, of which the following is a specification.

My present invention has reference to a motor vehicle transmission, and has among its objects to produce a construction of a comparatively simple nature easily operated to permit the starting, reversing, and speed variance of the driven shaft in an easy and effective manner and which obviates the jolts and jars usually accompanying such shifts.

Other objects and advantages will present themselves as the nature of the invention is better understood, reference being had to the drawings which accompany and which form part of this application.

In the drawings:—

Figure 1 is a plan view with parts in section, of my improved motor vehicle transmission.

Figure 2 is a sectional view approximately on the line 2—2 of Figure 1.

Figure 3 is a sectional view approximately on the line 3—3 of Figure 2.

Referring now to the drawings in detail, the numeral 1 designates the engine shaft which, as disclosed by the drawings, projects into the transmission casing 2. The numeral 3 designates the drive shaft which also projects into the transmission casing 2, the same being in a line with but terminating a suitable distance away from the end of the engine shaft 1.

Arranged in the casing 2 there is a frame 4. The frame has its outer or body portion of a substantially rectangular formation, one end thereof, however, being formed with a round hollow extension in the nature of a hub 5, the said hub projecting through a flanged bearing opening 6 in one end of the casing 2. The hub 6 has its outer end flanged inwardly, as at 7, and the inner face of the flange 7 is provided with clutch depressions 8, for a purpose which will hereinafter be apparent. If desired, suitable anti-frictional bearings may be provided between the frame and the bearings therefor in the casing 2.

On the end of the frame nearest the engine there is secured a disk 9, and to this disk there is connected one end of any desired number of cylinders 10. The open ends of the cylinders are secured to a disk 11 similar to the disk 9, the said disk 11 being provided with a hub portion 12 which is round in cross section and which is hollow to receive the engine shaft 1 therethrough, the engine shaft also passing through the disks 9 and 11, between the cylinders 10. The hub 11 finds a bearing in the end of the casing 2 nearest the engine, but projects a suitable distance beyond said end, having integrally formed therewith or secured thereon a brake wheel 13 around which is arranged a brake band 14. The brake band is brought into frictional engagement with the brake wheel or released from such engagement by the usual means (not shown).

The engine shaft 1 has the end thereof arranged in the frame 4 and in the casing 1 provided with a pinion 15. The pinion is in mesh with any desired number of planetary gears 16 which have their shafts journaled in bearings 17 respectively in transverse connecting members 18 and 19 for the sides of the frame 4. The shafts of the planetary gears have their ends projecting a suitable distance beyond the respective transverse members 18 or 19, and the said ends of the shaft have secured thereon pinions 20 and 21 respectively, the pinions 21 being slightly larger than the pinions 20. The pinions 21 are in mesh with a gear or pinion 22 which is provided with a hollow shaft 23 through which the engine shaft 1 passes, the said shaft 23 having a flange or head portion 24 that is in contact with the disk 9. The hollow shaft 23 also finds a bearing in a transverse element or partition 25 secured to the longitudinal or side members of the frame 4.

In each cylinder 10 there is a piston 26, each piston having a rod 27 that passes through a stuffing box 28 on the head for the cylinders provided by the disk 9.

Between the transverse member 25 of the frame 4 and the head or disk 9 there are guide rods arranged in spaced pairs and indicated, in the drawings, by the numeral 29 respectively. Each piston rod 27 has its end provided with a laterally extending arm 30 whose ends are notched to receive therein the guide members 29. Pivotally secured to the under face of each of the arms 30 at the connection thereof with the piston rods 27 is an anti-frictional roller 31, and all of these rollers are received in a groove 32 provided in the periphery of a camwheel 33 that is secured on the hollow shaft 23 for the pinion 22.

Each cylinder 10 has the wall of its bore, adjacent to its ends provided with depressions 34 respectively, the same being of a width to permit fluid passing therethrough to the opposite sides of the pistons 26 so that a vacuum in the cylinders cannot occur.

Each head or disk 9 and 11 for the cylinders 10 is provided with an air port. The air ports in the disk or head 9 are indicated by the numeral 35, the same, of course, communicating with the respective cylinders, and the air ports in the disk or head 11 are indicated by the numeral 36. There are pipe connections 37 between the ports 35 and 36, the said pipe members being disposed inward with respect to the cylinders 10. The pipes 25 and the ports 36 communicate with angle ports 38 in the hub 12, the lateral passages of the said ports being, for distinction, indicated by the numeral 38. On the hub 12 there is a slidable valve 40. The valve is in the nature of a ring member having a peripheral groove 41 in which are seated studs or roller members 42 arranged on the forked end 43 of a lever 44. The lever 44 is pivotally connected to a suitable bracket 45 that projects inwardly from one end of the casing 2, the said lever extending through a slot or opening 46 in the said casing.

The inner end of the drive shaft 3 is journaled in a suitable bearing in the transverse connecting element 18 for the longitudinal members of the frame 4, and freely mounted on the said shaft between the said element 18 and one end of the frame, is an internal ring gear 47 with which the pinions 20 are in mesh. The internal or ring gear 47 is provided with a hub 48 that finds a bearing in the end of the frame 4 adjacent thereto, the said hub being also received in the hub 5 of the frame and having secured on its end a disk 49 provided with clutch depressions 50.

Slidable on a spline on the drive shaft 3 and received in the hub 5 there is a sleeve 51. On the inner end of the sleeve, between the clutch elements 8 and 50 there is a disk 52 provided on its opposed faces with clutch surfaces or teeth 53 and 54 respectively. The end of the sleeve arranged outward of the hub 5 has formed thereon an annular enlargement or head 55 provided with a peripheral groove 56 in which are received studs or rollers 57 provided on the ends of the bifurcated portion 58 of a lever 59. The lever 59 is pivotally supported, as at 60, to a bracket 61 that extends from one of the ends of the casing 2.

When the drive shaft 3 is to be turned to propel the vehicle to which the device is attached in a straight ahead direction, the lever 59 is operated to bring the clutch elements 53 on the head 52 in engagement with the clutch depressions 8 on the flange 6 of the hub 5 of the frame 4. This, of course, locks the shaft 3 to the frame. The turning of the engine shaft 1 revolves the pinion 15 in the direction of the arrow in Figure 1. The turning of the pinion operates the gears 16 and the gears 20 and 21 connected with the shafts of the said gears in the direction of the arrows, Figure 1. The internal gear ring 47 being disconnected from the clutch sleeve 51 is permitted to idle, but the gears 21 turn the gear 22 in the direction of the arrow, Figure 1. The peripheral grooved cam wheel 33 on the hub 23 of the gear 22 will, of course, be also rotated. The rotation of this cam wheel imparts a reciprocatory movement to the pistons in the cylinders through the medium of the rollers 31 connected to the stems of the pistons. Air is freely admitted through the ports in the hub 12 and in the heads provided by the disks 9 and 11 for the cylinders 10. By operating the lever 44 the slide valve 40 may be brought to partially or wholly close these ports. When the ports are closed, air is prevented from entering the cylinders so that the pistons 26 will be retarded in their movement by air cushions in the cylinders. When the ports are slightly opened this cushion is partially removed, and when wholly opened, air may freely pass into and out of the cylinders. It will thus be noted that any desired speed may be obtained by swinging the lever 44 to slide the valve 40 to different positions over the inlet ports 39. When the automobile is traveling down an incline, the brake band 14 is applied to the brake wheel 13, the engine being preferably slowed down, and in so doing, holds the frame from turning, permitting the vehicle to make the descent at a low rate of speed. When the lever 59 is swung to bring the clutch head 52 to the position illustrated in Figure 1 of the drawings, the drive shaft is entirely disconnected from the engine shaft, but when the lever 59 is further swung to bring the clutch surfaces or teeth 54 in mesh with the clutch surfaces or depressions 50 in the head 49 on the hub 48 of the internal gear ring 47, the gear 15 operating the planetary gears 16, will cause the gears 20 connected on the shafts of the said gears 16 to turn the ring gear and consequently the drive shaft 3, but in a reverse direction to that previously described. By this means it will be seen that the vehicle will be caused to travel in a backward direction with respect to the path of travel previously referred to.

My motor vehicle transmission is, it will be noted, of a comparatively simple construction, the same allowing a connection between the motor and the drive shaft in an easy but effective manner without causing the breaking of parts which is common in the ordinary transmission construction. The lever 44, after the lever 59 has been actuated to bring the clutch head 52 to engage with the clutch surface 8 on the hub 6, is wholly employed for regulating the speed at which the vehicle travels and through the medium of the valve connected with the said lever 44 effectively controls such speed, the lever 59 being thereafter only employed for permitting the idling of the motor shaft and for reversing the direction of travel of the vehicle.

Having described the invention, I claim:—

1. A transmission between the motor shaft and the drive shaft of a motor propelled vehicle, comprising a frame, cylinders supported on the frame, pistons therein, a cam wheel revoluble by the motor shaft, means between the piston stems and said cam wheel for imparting a reciprocatory motion to the pistons, means admitting air into the cylinders at both sides of the pistons, means controlling said admission of air, brake means for the frame, means journaled in the frame and revoluble by the motor shaft in a direction reverse to the turning of the frame, and means for locking the drive shaft to either the frame or said last mentioned means.

2. A transmission between the motor shaft and the drive shaft of a motor driven vehicle, comprising a casing, a frame having hub ends journaled in the casing and receiving the respective shafts therein, a clutch surface in one of the hubs, cylinders supported on the frame, pistons therein having stems passing therethrough, guides on the frame for the stems, a peripherally grooved cam wheel revoluble by the turning of the motor shaft, anti-frictional elements carried by the stems received in the groove of the cam wheel whereby the pistons are reciprocated, means admitting air into the cylinders to the opposite sides of the pistons therein, means controlling said air admission, brake means for the frame, means on the frame revoluble by the motor shaft reversely with respect to the direction of turning of the frame, a clutch element associated with said means, a sleeve slidable in a keyway on the drive shaft, a clutch element thereon, and means for moving the sleeve to bring the clutch element into engagement with either of the mentioned clutch surfaces or to arrange the said element centrally therebetween.

3. The combination in a motor driven vehicle, of a transmission between the motor shaft and the drive shaft, comprising a revoluble frame in which the shaft finds bearings, a pinion keyed on the motor shaft, an internal gear ring freely mounted on the drive shaft, planetary gears meshing with the pinion and internal gear ring, a cam actuated by said planetary gears, cylinders, pistons therein reciprocated by said cam, means admitting air into the cylinders at both ends thereof, means controlling such air admission, brake means for the frame, and clutch means for locking the drive shaft to the frame or to the ring gear, as and for the purpose set forth.

4. The combination, in a motor driven vehicle, of a transmission between the motor shaft and the drive shaft, comprising a revoluble frame in which the ends of the shafts are journaled, a pinion on the motor shaft, an internal ring gear freely mounted on the drive shaft, planetary gears in mesh with the pinion and with the internal gear ring, a pinion also in mesh with the planetary gears, a hub thereon receiving therethrough the drive shaft, a peripherally grooved cam wheel secured on the hub, cylinders secured to the frame, pistons therein, stems therefor projecting through the cylinders, guide means between the frame and cylinders for said stems, a roller journaled on each of said stems and received in the groove of the cam wheel and whereby the pistons are reciprocated when motion is imparted to the last mentioned gear on the turning of the motor shaft, said cylinders having depressions in the bore thereof adjacent their ends, means admitting air into the cylinders at both ends thereof, means comprising a slidable valve controlling the entrance of such air, brake means for the frame, clutch means on the frame and on the ring gear, a sleeve slidable on a key on the drive shaft, a clutch head thereon, and lever operated means for sliding the sleeve to bring the clutch element thereof into engagement with the clutch means on either the frame or internal gear ring, as and for the purpose set forth.

CHARLES M. MORRISON.